United States Patent [19]

Glover

[11] Patent Number: 4,757,722
[45] Date of Patent: Jul. 19, 1988

[54] MOTION CONVERSION APPARATUS

[76] Inventor: Marvin J. Glover, 560 N St. SW. #N-111, Washington, D.C. 20024

[21] Appl. No.: 923,618

[22] Filed: Oct. 27, 1986

[51] Int. Cl.$^4$ ..................... F16H 33/10; F16H 37/00
[52] U.S. Cl. ............................................ 74/86; 74/52
[58] Field of Search .................. 74/25, 62, 52, 86; 272/50, 51

[56] References Cited

U.S. PATENT DOCUMENTS

| | | |
|---|---|---|
| 373,727 | 11/1887 | Deuss . |
| 541,382 | 6/1895 | Nachtigal .................................... 74/86 |
| 695,022 | 3/1902 | Albertson . |
| 862,311 | 8/1907 | Cory ....................................... 272/50 |
| 1,378,191 | 5/1921 | Pale . |
| 1,394,083 | 10/1921 | Griffiths . |
| 1,582,477 | 4/1926 | Lafitte . |
| 1,597,037 | 8/1926 | Hiorns . |
| 1,610,031 | 12/1926 | Backhouse . |
| 1,691,479 | 11/1928 | Hiorns . |
| 2,181,819 | 11/1939 | Radelet et al. . |
| 2,199,971 | 5/1940 | Sanders . |
| 2,528,963 | 11/1950 | Looney ..................................... 74/86 |
| 2,539,436 | 1/1951 | Kost ........................................ 74/86 |
| 2,595,253 | 5/1952 | Heehler et al. . |
| 2,610,520 | 9/1952 | Snow ....................................... 74/52 |
| 2,713,637 | 7/1955 | Wuerth et al. ........................... 74/86 |
| 2,746,303 | 5/1956 | Pollock .................................... 74/62 |
| 2,754,687 | 7/1956 | Brandon ................................... 74/52 |
| 2,991,657 | 7/1961 | Schatz ..................................... 74/86 |
| 3,006,203 | 10/1961 | Sewell ..................................... 74/86 |
| 3,108,185 | 10/1963 | Buerger ................................... 74/86 |
| 3,516,267 | 6/1970 | Uhlir . |
| 3,693,414 | 9/1972 | Soldner . |
| 3,765,687 | 10/1973 | Weiss ...................................... 74/86 |
| 4,015,508 | 4/1977 | Blodgett et al. . |
| 4,112,411 | 9/1978 | Alais et al. . |
| 4,121,775 | 10/1978 | Roseberg et al. . |
| 4,215,585 | 8/1980 | Kunii et al. . |
| 4,228,533 | 10/1980 | Siefert . |
| 4,237,549 | 12/1980 | Harle . |
| 4,241,437 | 12/1980 | Ashida . |
| 4,271,706 | 6/1981 | Ledley . |
| 4,341,120 | 7/1982 | Anderson . |
| 4,361,056 | 11/1982 | George . |
| 4,398,422 | 8/1983 | Haerten . |
| 4,434,661 | 3/1984 | Miwa et al. . |
| 4,455,872 | 6/1984 | Kossoff et al. . |
| 4,464,975 | 8/1984 | Terry et al. . |

FOREIGN PATENT DOCUMENTS

| | | | |
|---|---|---|---|
| 569879 | 4/1924 | France .................................... | 272/50 |
| 66380 | 4/1950 | Netherlands ........................... | 74/86 |
| 1024621 | 6/1983 | U.S.S.R. ................................. | 74/86 |

OTHER PUBLICATIONS

International Application, S. Rose, WO83/00204, published Jan. 20, 1983.

Primary Examiner—Lawrence J. Staab
Attorney, Agent, or Firm—Joseph Scafetta, Jr.

[57] ABSTRACT

A mechanism is disclosed for transforming reciprocating/rotating motion in which the reciprocating member is continuously rotated unidirectionally so as to perform 360 degrees of rotation over the course of each cycle of reciprocity, into any number of simultaneous arcuate motions intersecting at predetermined angles. This mechanism comprises a ball rotatably mounted by a supporting element and centered on a line which is perpendicular to the path of excursion of the reciprocating member at the midpoint of the excursion, which line coincides with the axis of rotation of the reciprocating member at the midpoint position, and a linkage(s) provided to transfer the motions of the reciprocating/rotating member(s) to the ball. Points on the surface of the ball are thereby made to exhibit an infinite number of arcs which intersect a common point at an infinite number of angles. Any number of arcs intersecting at any angle can be obtained by selecting points on the surface of the ball exhibiting those desired vectors. This motion conversion apparatus is the basis for improvements in a variety of existing devices including but not limited to grinders, mixers, pendulum devices, signal lights, scanning devices such as ultrasonic and radar scanners, and dispersing devices such as ordnance dispersing.

4 Claims, 3 Drawing Sheets

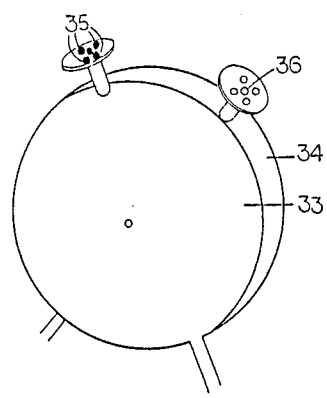
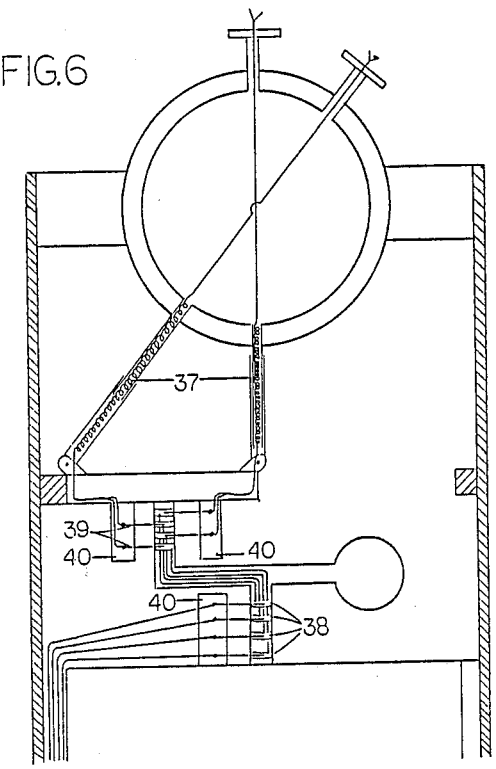

MOTION CONVERSION APPARATUS

BACKGROUND OF INVENTION

1. Field of Invention

The present invention relates to reciprocating drive mechanisms capable of producing oscillating output and particularly continuously variable oscillating outputs.

2. Description of the Related Art

Other devices for transforming reciprocating motion into oscillating motion are well known in the art. None of these devices however is capable of converting reciprocating motion into an infinite number of simultaneous oscillations having a single point source and intersecting at a common point, or of continuously varying the degree of oscillation for two perpendicular arcs having a single point source and intersecting at a common point.

SUMMARY OF THE INVENTION

In the preferred embodiment, reciprocating/rotating motion is supplied by a device in which a drive wheel is made to rotate in slip-free contact within a circular guide which has an internal diameter exactly twice the diameter of the wheel. Since circumference is directly proportional to diameter according to the formula $C = \pi D$, the circumference of the inside of the circular guide will be twice the circumference of the wheel. One rotation of the wheel inside the circular guide will cover half the distance around the circular guide. The motion of a point on the perimeter of the wheel which is in contact with the circular guide, over the course of one rotation of the wheel, will be to rotate 360 degrees and traverse the diameter of the circular guide. Continuous unidirectional rotation of the wheel converts to reciprocal motion of the point. A second point on the perimeter of the wheel diametrically opposite the first point (overlying the center of the circular guide), simultaneously describes a vector which is perpendicular to the vector diameter traversed by the first point. A third and a fourth point placed oppositely on the perimeter of the wheel midway between the first two points describe vectors which bisect the angles formed by the first pair of vectors. Any number of vector diameters can be obtained at any angle of intersection simply by selecting appropriate points on the perimeter of the wheel.

Any number of arcs can be obtained at any angle of intersection by transposing points on the perimeter of the wheel having vectors with those desired angles of intersection to points on the surface of a ball rotatably mounted in any direction and centered on a line which is perpendicular to the plane of the circular guide at its radius center. The points can be transposed by straight lines drawn from those points on the perimeter of the wheel through the center of the ball. Points on the surface of the ball where these lines enter and exit can then be made to exhibit arcuate vectors having the desired angles of intersection. The number of linkages between the perimeter of the rotating wheel and the ball bears no relation to the number of arcs which can be obtained. A single linkage between the perimeter of the rotating wheel and the center of the ball can in principle transpose an infinite number of arcuate vectors onto the surface of the ball if the linkage is designed in such a manner as to convey torque as well as leverage. In the preferred embodiment, the device is provided with two linkages originating at opposite points on the perimeter of the wheel which are fixed to the surface of the ball along lines intersecting at the center of the ball. Two linkages afford better transmission of torque from the wheel to the ball than one linkage. The linkages must be variable in length to accommodate the continuously varying distance between the ball and the points on the perimeter of the wheel which as they reciprocate are farthest from the ball at the end points and closest to the ball at the midpoint of their excursion. In the preferred embodiment, this variability of linkage length is done by means of two cylinders, one with an external diameter just small enough to slide inside the internal diameter of the larger cylinder.

Since the angle of attachment of the linkages on the perimeter of the wheel varies continuously as the attachment point passes to and fro underneath the center of the ball, the attachment of the linkage to the wheel must be jointed. The preferred method of attachment of the linkage to the perimeter of the wheel is by a hinge joint. The other end of the linkage is fixedly connected to the ball which freely turns in a socket.

Other means of positioning the ball, such as magnetic or fluid suspension, or other methods of linking the ball to the reciprocating/rotating members such as magnetic or elastic means, or other means of jointing the linkage to the reciprocating/rotating member such as by a ball and socket-like supporting element, or other means of supplying rotating/reciprocating drive such as a unidirectionally rotating drive shaft provided with crank pins eccentrically arranged with respect to the axis of the drive shaft which are rotated and translated within guides, do not compromise the intent of the inventor.

An alternate linkage means is comprised of cylinders which do not vary in length but which slide through holes provided near the perimeter of the wheel at diametrically opposite points on the wheel.

A second alternate linkage means is comprised of cylinders, preferably two in number each fixed at one end to the perimeter of the wheel perpendicular to the plane of the circumference of the wheel at diametrically opposite points. The cylinders are linked to a hollow ball which has an internal diameter greater than the length of excursion of the reciprocating cylinders. The cylinders attach to the ball by sliding through holes provided in the surface of the ball.

In a second embodiment, the degrees of arc for points on the surface of the ball can be easily and continuously varied. In this embodiment the ball is composed of two hemispherical members that are secured together so as to be capable of circumferential adjustment the one upon the other. The two hemispheres are secured together by a pin which acts also as an axle, passing at right angles through the plane of the circumferential edge at the center. The pin is recessed beneath the surface of the ball so as not to impinge on the ball supporting element during operation. In the preferred embodiment, the planar surface of one of the hemispheres is provided with a groove at the circumferential edge while the other hemisphere is provided with a correspondingly shaped tongue which will accurately fit the groove in the first hemisphere when the two are brought together. Thus equipped, the hemispherical members may be stably adjusted the one upon the other. In the preferred embodiment the pin securing the hemispheres together is held in place by a snap ring fitted into a groove near one of its ends, the other end being made secure by providing that end of the pin with a head. Bushings are provided within the recesses between the two hemispheres and the pin head and snap ring. Two cylindrical linkages are fixedly joined each to one and only one hemisphere such that the central axis of each linkage is on a line which passes through the circumferential edge of the hemisphere and the center of the ball. Leverage applied to the linkages circumferentially adjusts the hemispheres one upon the other.

A housing containing the ball and supporting element is movably mounted with respect to the wheel and circular guide such that the distance between them can be continuously varied in either direction along a line connecting the center of the ball and the radius center of the circular guide. As the ball and supporting element are moved closer to the radius center of the circular guide, leverage is applied through the linkages to circumferentially adjust the hemispheres to accommodate the larger angle formed by the intersection of the central axes of the slidable linkages and the center of the ball. Conversely as the ball and supporting element are moved away from the radius center of the circular guide, the angle formed by the center of the ball and the linkages becomes more acute as the hemispheres are rotated in the opposite direction.

By transposing the two points on the wheel which correspond to the points of origin of the two diametrically opposed linkages, to two points on the common circumferential edge of the conjoined hemispheres by means of lines which are coaxial with the central axes of the linkages and which intersect both the circumferential edge and the center of the ball, the linear vectors are transposed into arcuate vectors with the same (90 degree) intersection. In the preferred embodiment, the two points lying on the circumferential edge are transposed onto mounting platforms provided on each hemisphere opposite the point of insertion of the linkage onto the hemisphere and adjacent to the circumferential edge, said platforms being cantilevered and centered over the circumferential edge, said platforms serving as the support base for a variety of devices.

That other arcuate point vectors exist on the ball also alterable in degrees of arc, does not alter the intent of the inventor which is to illustrate a function. It is also recognized by the inventor that there are alternate means for varying the degree of circumferential adjustment of the hemispheres such as by providing the linkage hinge joints with slidable attachments to the wheel allowing straight line movement of the linkages from the perimeter of the wheel towards the center of the wheel.

Since it is intended to enhance the functions of a variety of devices by attaching them onto the mounting platforms, and since many of these devices are electrical, the preferred embodiment of the motion conversion apparatus is provided with a hollow drive shaft, crank arm, crank pin, linkages, ball, and platform support to contain electrical wiring. In the preferred embodiment, slip rings and brushes are provided to complete the circuit at the rotating electrical junctions.

An alternate means of electrification across rotating junctions can be provided by electrical to optical converters and by transmitting the light to photoelectric solar panels. Microwaves can also be employed in this capacity.

BRIEF DESCRIPTION OF THE DRAWINGS

FIG. 5 is a perspective view of the ball shown in FIG. 3.

FIG. 6 is a cross-sectional side elevational view of the first preferred embodiment with parts broken away to show an exemplary electrical wiring arrangement.

DETAILED DESCRIPTION OF THE PREFERRED EMBODIMENTS

Figure 1:
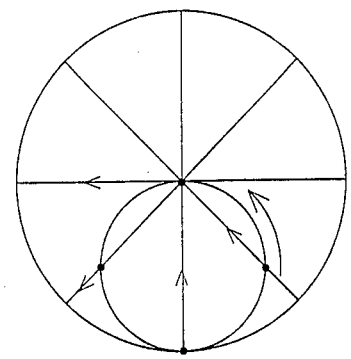
FIG. 1 is a schematic top plan view of the first preferred embodiment of the present invention, showing vectors of four mounting points.

FIG. 1 shows the vectors of four points on the perimeter of a drive wheel made to rotate in slip free contact within a circular guide having an internal diameter twice the diameter of the wheel, illustrating the relationship between the points on the perimeter of the wheel and the angles at which their respective vectors intersect.

Figure 2:
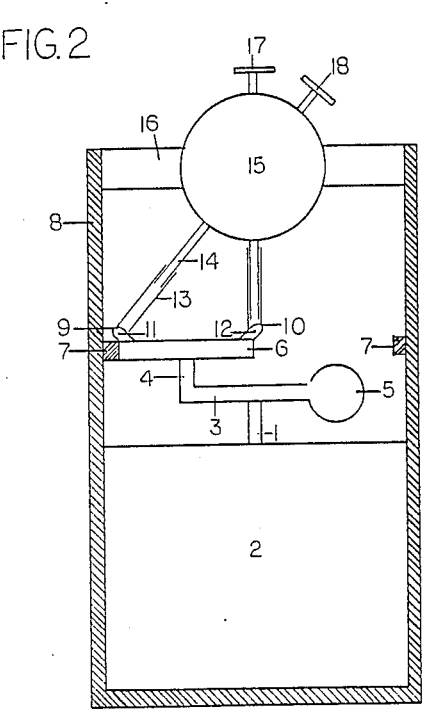
FIG. 2 is a cross-sectional side elevational view of the first preferred embodiment.

FIG. 2 is a cross sectional side elevational view of the first embodiment showing a rotary drive shaft 1 turnably mounted on a motor means 2, crank means 3 fixed to said drive shaft 1, a crank pin 4 eccentrically arranged with respect to the axis of said drive shaft 1, a counterweight 5 to stabilize a wheel 6, said wheel 6 being coaxial with said crank pin 4 and freely rotatably mounted thereon, a circular guide 7 coaxial with said drive shaft 1 and stationarily mounted on a support housing means 8 and being in slip free contact with said wheel 6, said circular guide 7 having an internal diameter exactly twice that of the external diameter of the wheel 6, said wheel 6 being provided with two hinges 9 and 10 fixedly mounted diametrically opposite each other on the periphery of the wheel 6 on the side of the wheel 6 facing away from the drive shaft 1 and having hinge pins 11 and 12 arranged parallel to each other and to the plane of the circumference of the wheel 6, said hinges 9 and 10 each supporting one end of a cylindrical linkage member 13 within which another cylindrical linkage member 14 slidably interpenetrates, said other cylindrical members 14 each having one end fixed to the surface of a ball 15 so that the central axes of the cylindrical members 13 and 14 intersect at the center of the ball 15, said ball 15 being centered in line with the central axis of the drive shaft 1 and being rotatably mounted by a supporting element 16, such supporting element 16 providing exposure of the ball surface on opposite sides of an equatorial ring, the plane of said ring being parallel to the plane of the wheel 6 and circular guide 7 and encircling the linkages on the side facing the wheel 6 and circular guide 7 and encircling on the opposite side mountings 17 and 18 here limited to two for purposes of illustration.

Figure 3:
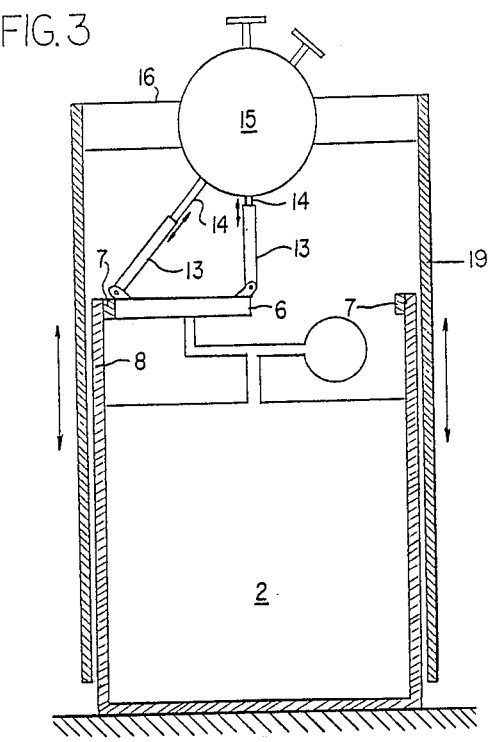
FIG. 3 is a cross-sectional side elevational view of the second preferred embodiment.

FIG. 3 is a cross sectional side elevational view of the second embodiment which provides variable degrees of arcs. In the preferred embodiment, the ball 15, comprised of two hemispherical members, and ssupporting element 16 are mounted in a movable housing 19 which is slidably linked to the support housing means 8 containing the circular guide 7, wheel 6 and motor means 2, by providing said housings 8 and 19 with cylindrical shapes, the internal diameter of said movable housing 19 being slightly bigger than the external diameter of the support housing means 8 which interpenetrates it. As the housing 19 moves up and down over the support housing means 8, the cylindrical linkage member 14 moves in and out of the cylindrical linkage member 13 and circumferentially adjusts the hemispherical members shown in FIG. 4.

Figure 4:
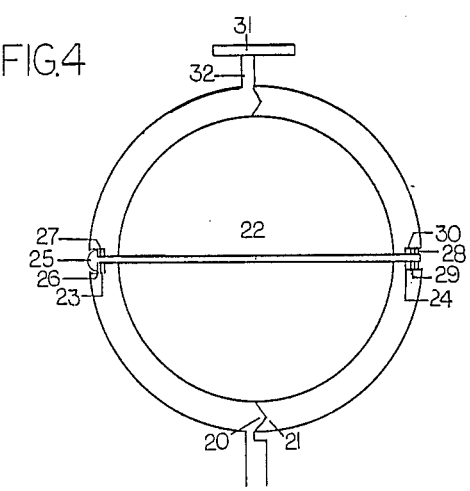
FIG. 4 is an internal cross-sectional side elevational view of the ball shown in FIG. 3.

FIG. 4 is a detail of the ball in the second embodiment showing, in an internal cross-sectional side elevational view, the hollow interior of the ball 15, the preferred tongue 20 and groove 21 configuration of the opposing hemispheric surfaces, the axle pin 22, the recesses 23 and 24 in said hemispheres containing the pin head 25, washer 26, bushing 27, snap ring 28, washer 29 and bushing 30. The center of mounting platform 31 is shown offset from its support 32, said platform 31 being centered over the plane of the circumference.

FIG. 5 is a detail of the ball 15 in the second embodiment showing in perspective view the hemispherical members 33 and 34 and the aforesaid mounting platforms 31 each provided with four bolt holes 35 for mounting various devices and a fifth central hole 36 provided for electrical wiring.

FIG. 6 demonstrates the preferred electrical wiring and shows wiring 37, slip ring contacts 38, brushes 39, and brush mounting 40.

These capabilities result in improvements in a number of existing devices, including grinders, mixers, pendulum devices, signal lights, ultrasonic and radar scanners, and ordnance dispersion systems. The improvement in grinders is the high surface area contact of a perfect sphere in the preparation of fine powders. The improvement in fluid mixers is the uniformity of mixing inside a sphere oscillating in an infinite number of directions. The improvement in pendulum devices allows any number of pendula to swing from a single point source and intersect at any angle allowing easy viewing from a variety of spatial orientations and providing an aesthetic component to the viewing. The improvement in signal lights is in creating an intricate display of lights moving in synchronized intersecting arcs. The improvement in ultrasonic scanners and one which applies to mechanical scanning systems in general is in the ability to perform volumetric and contour analyses by scanning multiple intersecting sectors simultaneously and in the ability to go from wide scan-low resolution to narrow scan-high resolution easily and continuously in two perpendicular sectors. The improvement in ordnance dispersion systems and one which applies to mechanical dispersion systems in general is in the ability to disperse in any number of intersecting sectors simultaneously and in the capability of moving from wide dispersion-low density to narrow dispersion-high density easily and continuously in two perpendicular sectors.

It is further recognized that the degree of arc is a function of the proportionate size of the aforesaid inclined circle in relation to the sphere. The arcs increase in degree as the size of the circle increases in proportion to the volume of the sphere to a maximum of 180 degrees of arc obtained when the diameter of the circle extends from the aforesaid imaginary line at its point of intersection with the altitude of the inclined circle, to the plane corresponding to the equator of the sphere.

It should also be clear from the foregoing description of the vector that a rotating and revolving circular body may be substituted for the body of a sphere in certain applications without changing the basic function of the invention.

From the foregoing description, it is believed that those skilled in the art will readily appreciate the unique features and advantages of the present invention over previous types of oscillatory mechanisms and adjustable output versions thereof. Furthermore it is to be understood that while the present invention has been described in relation to particular preferred and alternate embodiments as set forth in the accompanying drawings and as above described, the same nevertheless is susceptible to change, variation and substitution of equivalents without departing from the spirit and scope of this invention. It is therefore intended that the present invention be unrestricted by the foregoing description and drawings except as may appear in the following appended claims.

I claim:

1. A mechanism for transforming continuous unidirectional rotating and reciprocating motions into a plurality of arcuate motions intersecting each other along defined paths at preselected angles, comprising:
   a continuously unidirectional rotating drive apparatus;
   linkage means, rotated and reciprocated by the drive apparatus in response to rotation of said drive apparatus, for transmitting torque, said linkage means being attached at one end to said drive apparatus;
   rotating body means, fixed to an opposite end of the linkage means, for receiving torque transmitted by the linkage means, said body means having a center of rotation;
   means for defining a path within which the drive apparatus rotates, said path-defining means lying in a circular plane having a diameter with a center point; and
   means for supporting the rotating body means so that the center of rotation of said rotating body means is located on an imaginary line perpendicular to the circular plane of the path-defining means through the center point of the diameter.

2. The mechanism according to claim 1 wherein:
   said path-defining means includes a circular guide in which the drive apparatus rotates, said drive apparatus rotating 360 degrees inside the circular guide with each period of reciprocation of the linkage means.

3. The mechanism according to claim 1, further comprising:
   means, secured to the body means at points away from the opposite ends of the linkage means, for mounting devices to said body means.

4. A mechanism for transforming continuous unidirectional rotating motion and reciprocating motion into two arcuate motions of continuously varying degrees, comprising:
   a motor;
   a rotary drive shaft operatively connected to the motor;
   a wheel apparatus connected to and driven by the rotary drive shaft;
   a first hollow cylindrical stationary housing fitted around the wheel apparatus, said housing having an imaginary longitudinal center line;
   linkages fixed at one end to and rotated with the wheel apparatus, said linkages reciprocating in response to rotation of the wheel apparatus;
   A ball formed of two hemispheric members each fixed to an opposite end of one of the linkages, said hemispheric members being rotated in response to reciprocation of the linkages;
   a second hollow cylindrical movable housing fitted around the first hollow cylindrical stationary housing, the linkages, and the ball, said movable second housing having an imaginary longitudinal center line coincident with the imaginary longitudinal center line of the first stationary housing;

means, extending between the hemispheric members of the ball and the movable second housing, for supporting the ball along the longitudinal center line of the movable second housing;

axle means, extending internally between the two hemispheric members, for securing said two hemispheric members together; and means, secured to the hemispheric members of the ball 180 degrees from the opposite ends of the linkages, for mounting devices to the hemispheric members of the ball.

* * * * *